Figures 1, 2:
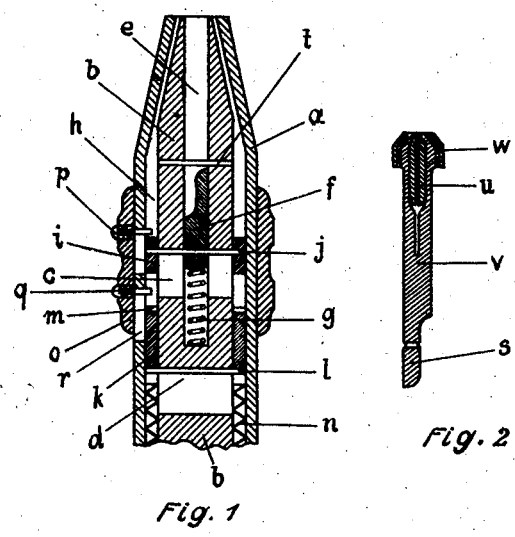

June 19, 1928.

H. STARK

HOLDER FOR DENTISTS' DRILLING INSTRUMENTS

Filed Dec. 3, 1926

1,674,486

Patented June 19, 1928.

1,674,486

UNITED STATES PATENT OFFICE.

HANS STARK, OF HERMSDORF, NEAR BERLIN, GERMANY, ASSIGNOR TO DEUTSCHE GOLD- UND SILBER-SCHEIDEANSTALT VORMALS ROESSLER, OF FRANKFORT-ON-THE-MAIN, GERMANY, A CORPORATION OF GERMANY.

HOLDER FOR DENTISTS' DRILLING INSTRUMENTS.

Application filed December 3, 1926. Serial No. 152,350.

My invention relates to a holder for dental drilling instruments and the like. The invention consists in providing a setting device, by a simple shifting of which in the axial direction of the holder, the movement of the spindle can be braked or released, and by which also the replacing of the drill holder shank is rendered possible.

The setting member may comprise, for instance a ring sliding on the grinding handle or longitudinally adjustable thereon and which acts on parts contained within the sleeve of the holder, such as for instance the driving spindle and the tool holder, by means of extensions which project through an elongated slot in the sleeve of the grinding handle into the interior, and there act on setting rings adjustable in the axial direction, preferably supported by springs and connected to the spindle or to the tool driver. The arrangement may be made for instance, in such a manner that when the setting part or member is moved to the extent of half the length of the slot, the driving spindle proper will be stopped, whilst when the setting ring is pulled to the extent of the whole length of the slot, it will be possible to introduce or disconnect the grinding tools.

The holder proper for the grinding tools may be at the same time made into a detachable reducing head.

A construction according to the invention is shown by way of example in the accompanying drawing in section.

Figure 1 is a cross section of the holder containing the driving spindle and showing the features of my invention. Figure 2 is a detachable reducing head adapted to fit into the driving spindle in the holder.

In detail, the holder is constituted by a sleeve $a$ in which rotates the driving spindle $b$ which is provided with two elongated slots $c$ and $d$. In the bore $e$ of the driving spindle is longitudinally adjustable a driver $f$ which is preferably supported by means of the spring $g$. On the driving spindle is also mounted in a longitudinally adjustable manner, in an annular intermediate space $h$ between the sleeve $a$ and the driving spindle $b$, a setting ring $i$ which is connected to the driver $f$, for instance by means of a pin $j$ passing through a slot $c$. In the intermediate space $h$ is further arranged, also in a longitudinally adjustable manner, a second setting ring $k$ which is provided with a projection or pin $L$ passing through the slot $d$ of the spindle, and carries at its upper edge teeth $m$. The setting ring $k$ is provided with a spring suspension or support $n$. On the outside on the sleeve $a$ is mounted the outer push part $o$ from which projections, for instance, set screws $p$ and $q$, project through recesses $r$ of the sleeve $a$ into the intermediate space $h$.

Figure 2 shows the reducing head withdrawn from the holder, the shanks $s$ of which is given a shape corresponding to that of the driver $f$ and which is connected to the driving spindle $b$ for instance, by means of a pin $t$. In the upper part of the reducing head $v$ is fixed a clamping sleeve $u$ with a screw $w$ provided with inner threads.

The manipulation of the holder, for instance, when replacing a grinding or a drilling tool, is as follows:

The outer push part $o$ is pulled down in the given direction away from the holder shoulder. The set screw of the inner setting ring $i$ to $p$ then presses the inner setting ring $i$ towards the setting ring $k$. When the ring $o$ has been pulled, to the extent of half the length of the slot, the set screw $q$ engages with the teeth $m$ of the inner setting ring $k$ and produces the stopping of the driving spindle $b$. During further pulling down of the outer push part $o$ to the extent of the whole length of the slot, the driver $f$ which is connected by the pin $j$ to the setting ring $i$, is pressed against the spring $g$, so that the reducing head $s$ is released, and the reducing head can be withdrawn from the sleeve.

The construction of the holder according to the invention can be varied in many ways without departing from the invention.

Owing to the movement of the setting member in the holder according to the invention taking place, both for the driving of the spindle and for the replacing on the tool, in one direction only, namely in the axial direction, the advantage is obtained that the dentist can work the holder conveniently with one hand. If, for instance, one manipulation were to require a longitudinal movement, and the other a rotation of the setting member, the manipulation would require the co-operation of the second hand, as it would be impossible, or only possible with great difficulty, to effect this rotation after, for instance, the thumb has been bent for effecting the longitudinal movement.

What I claim is:—

1. In a dentist's drilling instrument holder having a casing with a driving spindle therein, the combination of a means for exerting a braking action on said spindle, means for engaging tools or tool holders in said spindle, and a sleeve means about said casing for operating said braking means and tool engaging means by simple longitudinal motion of said sleeve.

2. In a dentist's drilling instrument holder having a casing with a driving spindle therein, the combination of tool engaging device in said spindle, a loose ring about said spindle inside said casing and connected to said tool engaging device by means of a pin through an elongated slot in said spindle, a longitudinally movable sleeve about said casing acting on said ring through a slot in said casing to engage and disengage tools from said holder.

3. In a dentist's drilling instrument holder having a casing with a driving spindle therein, a tool engaging device in said spindle, a loose ring about said spindle inside said casing and connected to said tool engaging device by means of a pin through an elongated slot in said spindle, a second ring independent and below the first about said spindle and slidably connected thereto by means of a pin in a second elongated slot in said spindle, a longitudinally movable sleeve about said casing acting on said rings through slots in said casing to exert a braking action on said second ring and to engage or disengage tools from said holder by action on said first ring.

Signed at Berlin, Brandenburg, Prussia this 13th day of November A. D. 1926.

HANS STARK.